United States Patent
Harris, Jr. et al.

(10) Patent No.: US 8,814,518 B2
(45) Date of Patent: Aug. 26, 2014

(54) APPARATUS AND METHODS FOR COOLING PLATFORM REGIONS OF TURBINE ROTOR BLADES

(75) Inventors: John Wesley Harris, Jr., Taylors, SC (US); Craig Allen Bielek, Simpsonville, SC (US); Scott Edmond Ellis, Easley, SC (US); Xiaoyong Fu, Greer, SC (US)

(73) Assignee: General Electric Company, Schenectady, NY (US)

(*) Notice: Subject to any disclaimer, the term of this patent is extended or adjusted under 35 U.S.C. 154(b) by 896 days.

(21) Appl. No.: 12/915,477

(22) Filed: Oct. 29, 2010

(65) Prior Publication Data

US 2012/0107134 A1 May 3, 2012

(51) Int. Cl.
*F01D 5/18* (2006.01)

(52) U.S. Cl.
USPC ............... 416/97 R; 416/193 A; 29/889.721; 29/557

(58) Field of Classification Search
USPC ............. 415/115, 116; 416/96 R, 97 A, 97 R, 416/193 A, 193 R; 29/889.721, 557
See application file for complete search history.

(56) References Cited

U.S. PATENT DOCUMENTS

| | | | |
|---|---|---|---|
| 3,800,864 A * | 4/1974 | Hauser et al. | 165/47 |
| 3,950,114 A | 4/1976 | Helms | |
| 4,017,213 A * | 4/1977 | Przirembel | 416/97 A |
| 4,353,679 A * | 10/1982 | Hauser | 415/115 |
| 4,712,979 A | 12/1987 | Finger | |
| 4,798,514 A | 1/1989 | Pask | |
| 5,197,852 A * | 3/1993 | Walker et al. | 415/115 |
| 5,340,278 A | 8/1994 | Magowan | |
| 5,382,135 A | 1/1995 | Green | |
| 5,609,466 A * | 3/1997 | North et al. | 415/115 |
| 5,813,835 A | 9/1998 | Corsmeier et al. | |
| 6,019,579 A | 2/2000 | Fukuno et al. | |
| 6,089,822 A * | 7/2000 | Fukuno | 415/115 |
| 6,120,249 A | 9/2000 | Hultgren et al. | |
| 6,190,130 B1 | 2/2001 | Fukue et al. | |
| 6,196,799 B1 | 3/2001 | Fukue et al. | |

(Continued)

FOREIGN PATENT DOCUMENTS

| JP | 09250302 A * | 9/1997 | F01D 5/18 |
|---|---|---|---|
| JP | 10252404 A * | 9/1998 | F01D 5/18 |
| JP | 2005146858 A * | 6/2005 | F01D 5/18 |
| JP | 2006188962 A * | 7/2006 | |

*Primary Examiner* — Edward Look
*Assistant Examiner* — Christopher R Legendre
(74) *Attorney, Agent, or Firm* — Mark E. Henderson; Ernest G. Cusick; Frank A. Landgraff

(57) ABSTRACT

A platform cooling arrangement in a turbine rotor blade having a platform at an interface between an airfoil and a root, wherein the rotor blade includes an interior cooling passage that extends from a connection at the root to the approximate radial height of the platform, wherein, the interior cooling passage comprises a high-pressure coolant region and a low-pressure coolant region, and wherein a pressure side of the platform comprises a topside extending circumferentially from the airfoil to a pressure side slashface. The platform cooling arrangement may include: a platform cavity formed within the pressure side of the platform, a high-pressure connector that connects the platform cavity to the high-pressure coolant region of the interior cooling passage; a low-pressure connector that connects the platform cavity to the low-pressure coolant region of the interior cooling passage; and a pin bank formed within the platform cavity that includes radial pins.

25 Claims, 9 Drawing Sheets

(56) References Cited

U.S. PATENT DOCUMENTS

| | | |
|---|---|---|
| 6,402,471 B1 * | 6/2002 | Demers et al. ............ 416/97 R |
| 6,431,833 B2 | 8/2002 | Jones |
| 6,478,540 B2 | 11/2002 | Abuaf et al. |
| 7,097,424 B2 | 8/2006 | Cunha et al. |
| 7,147,439 B2 | 12/2006 | Jacala et al. |
| 7,198,467 B2 | 4/2007 | Keith et al. |
| 7,347,664 B2 | 3/2008 | Kayser et al. |
| 7,416,391 B2 | 8/2008 | Veltre et al. |
| 7,695,247 B1 * | 4/2010 | Liang ........................ 416/97 R |
| 2005/0058545 A1 * | 3/2005 | Cardenas .................. 416/97 R |
| 2006/0056968 A1 | 3/2006 | Jacala et al. |
| 2006/0269409 A1 * | 11/2006 | Torii et al. .................. 416/97 R |
| 2007/0189896 A1 | 8/2007 | Itzel et al. |
| 2009/0226300 A1 * | 9/2009 | Knapp et al. ................ 415/116 |
| 2012/0082548 A1 * | 4/2012 | Ellis et al. ...................... 416/95 |
| 2012/0082549 A1 * | 4/2012 | Ellis et al. ...................... 416/95 |
| 2012/0082550 A1 * | 4/2012 | Harris et al. ................... 416/95 |
| 2012/0082564 A1 * | 4/2012 | Ellis et al. .................. 416/97 R |
| 2012/0082565 A1 * | 4/2012 | Ellis et al. .................. 416/97 R |
| 2012/0107134 A1 * | 5/2012 | Harris et al. ............... 416/97 R |
| 2013/0171003 A1 * | 7/2013 | Ellis et al. .................. 416/97 R |
| 2013/0171004 A1 * | 7/2013 | Ellis et al. .................. 416/97 R |
| 2013/0171005 A1 * | 7/2013 | Ellis et al. .................. 416/97 R |

* cited by examiner

APPARATUS AND METHODS FOR COOLING PLATFORM REGIONS OF TURBINE ROTOR BLADES

BACKGROUND OF THE INVENTION

The present application relates generally to combustion turbine engines, which, as used herein and unless specifically stated otherwise, includes all types of combustion turbine engines, such as those used in power generation and aircraft engines. More specifically, but not by way of limitation, the present application relates to apparatus, systems and/or methods for cooling the platform region of turbine rotor blades.

A gas turbine engine typically includes a compressor, a combustor, and a turbine. The compressor and turbine generally include rows of airfoils or blades that are axially stacked in stages. Each stage typically includes a row of circumferentially spaced stator blades, which are fixed, and a set of circumferentially spaced rotor blades, which rotate about a central axis or shaft. In operation, the rotor blades in the compressor are rotated about the shaft to compress a flow of air. The compressed air is then used within the combustor to combust a supply of fuel. The resulting flow of hot gases from the combustion process is expanded through the turbine, which causes the rotor blades to rotate the shaft to which they are attached. In this manner, energy contained in the fuel is converted into the mechanical energy of the rotating shaft, which then, for example, may be used to rotate the coils of a generator to generate electricity.

Referring to FIGS. 1 and 2, turbine rotor blades 100 generally include an airfoil portion or airfoil 102 and a root portion or root 104. The airfoil 102 may be described as having a convex suction face 105 and a concave pressure face 106. The airfoil 102 further may be described as having a leading edge 107, which is the forward edge, and a trailing edge 108, which is the aft edge. The root 104 may be described as having structure (which, as shown, typically includes a dovetail 109) for affixing the blade 100 to the rotor shaft, a platform 110 from which the airfoil 102 extends, and a shank 112, which includes the structure between the dovetail 109 and the platform 110.

As illustrated, the platform 110 may be substantially planar. More specifically, the platform 110 may have a planar topside 113, which, as shown in FIG. 1, may include an axially and circumferentially extending flat surface. As shown in FIG. 2, the platform 110 may have a planar underside 114, which may also include an axially and circumferentially extending flat surface. The topside 113 and the bottom side 114 of the platform 110 may be formed such that each is substantially parallel to the other. As depicted, it will be appreciated that the platform 110 typically has a thin radial profile, i.e., there is a relatively short radial distance between the topside 113 and the bottom side 114 of the platform 110.

In general, the platform 110 is employed on turbine rotor blades 100 to form the inner flow path boundary of the hot gas path section of the gas turbine. The platform 110 further provides structural support for the airfoil 102. In operation, the rotational velocity of the turbine induces mechanical loading that creates highly stressed regions along the platform 110 that, when coupled with high temperatures, ultimately cause the formation of operational defects, such as oxidation, creep, low-cycle fatigue cracking, and others. These defects, of course, negatively impact the useful life of the rotor blade 100. It will be appreciated that these harsh operating conditions, i.e., exposure to extreme temperatures of the hot gas path and mechanical loading associated with the rotating blades, create considerable challenges in designing durable, long-lasting rotor blade platforms 110 that both perform well and are cost-effective to manufacture.

One common solution to make the platform region 110 more durable is to cool it with a flow of compressed air or other coolant during operation, and a variety of these type of platform designs are known. However, as one of ordinary skill in the art will appreciate, the platform region 110 presents certain design challenges that make it difficult to cool in this manner. In significant part, this is due to the awkward geometry of this region, in that, as described, the platform 110 is a periphery component that resides away from the central core of the rotor blade and typically is designed to have a structurally sound, but thin radial thickness.

To circulate coolant, rotor blades 100 typically include one or more hollow cooling passages 116 (see FIGS. 3, 4, 5, and 9) that, at minimum, extend radially through the core of the blade 100, including through the root 104 and the airfoil 102. As described in more detail below, to increase the exchange of heat, such cooling passages 116 may be formed having a serpentine path that winds through the central regions of the blade 100, though other configurations are possible. In operation, a coolant may enter the central cooling passages via one or more inlets 117 formed in the inboard portion of the root 104. The coolant may circulate through the blade 100 and exit through outlets (not shown) formed on the airfoil and/or via one or more outlets (not shown) formed in the root 104. The coolant may be pressurized, and, for example, may include pressurized air, pressurized air mixed with water, steam, and the like. In many cases, the coolant is compressed air that is diverted from the compressor of the engine, though other sources are possible. As discussed in more detail below, these cooling passages typically include a high-pressure coolant region and a low-pressure coolant region. The high-pressure coolant region typically corresponds to an upstream portion of the cooling passage that has a higher coolant pressure, whereas the low-pressure coolant region corresponds to a downstream portion having a relatively lower coolant pressure.

In some cases, the coolant may be directed from the cooling passages 116 into a cavity 119 formed between the shanks 112 and platforms 110 of adjacent rotor blades 100. From there, the coolant may be used to cool the platform region 110 of the blade, a conventional design of which is presented in FIG. 3. This type of design typically extracts air from one of the cooling passages 116 and uses the air to pressurize the cavity 119 formed between the shanks 112/platforms 110. Once pressurized, this cavity 119 then supplies coolant to cooling channels that extend through the platforms 110. After traversing the platform 110, the cooling air may exit the cavity through film cooling holes formed in the topside 113 of the platform 110.

It will be appreciated, however, that this type of conventional design has several disadvantages. First, the cooling circuit is not self-contained in one part, as the cooling circuit is only formed after two neighboring rotor blades 100 are assembled. This adds a great degree of difficulty and complexity to installation and pre-installation flow testing. A second disadvantage is that the integrity of the cavity 119 formed between adjacent rotor blades 100 is dependent on how well the perimeter of the cavity 119 is sealed. Inadequate sealing may result in inadequate platform cooling and/or wasted cooling air. A third disadvantage is the inherent risk that hot gas path gases may be ingested into the cavity 119 or the platform itself 110. This may occur if the cavity 119 is not maintained at a sufficiently high pressure during operation. If the pressure of the cavity 119 falls below the pressure within the hot gas path, hot gases will be ingested into the shank cavity 119 or the platform 110 itself, which typically damages these components as they were not designed to endure exposure to the hot gas-path conditions.

FIGS. 4 and 5 illustrate another type of conventional design for platform cooling. In this case, the cooling circuit is contained within the rotor blade 100 and does not involve the shank cavity 119, as depicted. Cooling air is extracted from one of the cooling passages 116 that extend through the core of the blade 110 and directed aft through cooling channels 120 formed within the platform 110 (i.e., "platform cooling channels 120"). As shown by the several arrows, the cooling air flows through the platform cooling channels 120 and exits through outlets in the aft edge 121 of the platform 110 or from outlets disposed along the suction side edge 122. (Note that in describing or referring to the edges or faces of the rectangular platform 110, each may be delineated based upon its location in relation to the suction face 105 and pressure face 106 of the airfoil 102 and/or the forward and aft directions of the engine once the blade 100 is installed. As such, as one of ordinary skill in the art will appreciate, the platform may include an aft edge 121, a suction side edge 122, a forward edge 124, and a pressure side edge 126, as indicated in FIGS. 3 and 4. In addition, the suction side edge 122 and the pressure side edge 126 also are commonly referred to as "slashfaces" and the narrow cavity formed therebetween once neighboring rotor blades 100 are installed may be referred to as a "slashface cavity".)

It will be appreciated that the conventional designs of FIGS. 4 and 5 have an advantage over the design of FIG. 3 in that they are not affected by variations in assembly or installation conditions. However, conventional designs of this nature have several limitations or drawbacks. First, as illustrated, only a single circuit is provided on each side of the airfoil 102 and, thus, there is the disadvantage of having limited control of the amount of cooling air used at different locations in the platform 110. Second, conventional designs of this type have a coverage area that is generally limited. While the serpentine path of FIG. 5 is an improvement in terms of coverage over FIG. 4, there are still dead areas within the platform 110 that remain uncooled. Third, to obtain better coverage with intricately formed platform cooling channels 120, manufacturing costs increase dramatically, particularly if the cooling channels having shapes that require a casting process to form. Fourth, these conventional designs typically dump coolant into the hot gas path after usage and before the coolant is completely exhausted, which negatively affects the efficiency of the engine. Fifth, conventional designs of this nature generally have little flexibility. That is, the channels 120 are formed as an integral part of the platform 110 and provide little or no opportunity to change their function or configuration as operating conditions vary. In addition, these types of conventional designs are difficult to repair or refurbish.

As a result, conventional platform cooling designs are lacking in one or more important areas. There remains a need for improved apparatus, systems, and methods that effectively and efficiently cool the platform region of turbine rotor blades, while also being cost-effective to construct, flexible in application, and durable.

BRIEF DESCRIPTION OF THE INVENTION

The present application thus describes a platform cooling arrangement in a turbine rotor blade having a platform at an interface between an airfoil and a root, wherein the rotor blade includes an interior cooling passage formed therein that extends from a connection with a coolant source at the root to at least the approximate radial height of the platform, wherein, in operation, the interior cooling passage comprises a high-pressure coolant region and a low-pressure coolant region, and wherein, along a side that coincides with a pressure side of the airfoil, a pressure side of the platform comprises a topside extending circumferentially from the airfoil to a pressure side slashface, and along a side that coincides with a suction side of the airfoil, a suction side of the platform comprises a topside extending circumferentially from the airfoil to a suction side slashface. The platform cooling arrangement may include: a platform cavity formed within at least one of the pressure side and the suction side of the platform, the platform cavity including an inboard floor and an outboard ceiling; a high-pressure connector that connects the platform cavity to the high-pressure coolant region of the interior cooling passage; a low-pressure connector that connects the platform cavity to the low-pressure coolant region of the interior cooling passage; and a pin bank formed within the platform cavity, wherein the pin bank includes a plurality of pins that extend in an approximate radial direction between the floor to the ceiling of the platform cavity.

The present application further describes a method of creating a platform cooling arrangement for a turbine rotor blade having a platform at an interface between an airfoil and a root, wherein the rotor blade includes an interior cooling passage formed therein that extends from a connection with a coolant source at the root to at least the approximate radial height of the platform, wherein, in operation, the interior cooling passage comprises at least a high-pressure coolant region and a low-pressure coolant region, and wherein, along the side that coincides with a pressure side of the airfoil, a pressure side of the platform comprises a topside extending circumferentially from the airfoil to a pressure side slashface. The method may include the steps of: forming a platform cavity within the pressure side of the platform, the platform cavity including an inboard substantially planar floor that opposes an outboard substantially planar ceiling; from a position on the pressure side slashface or the suction side slashface, machining a high-pressure connector that connects the platform cavity to the high-pressure coolant region of the interior cooling passage; from a position on the pressure side slashface or the suction side slashface, machining a low-pressure connector that connects the platform cavity to the low-pressure coolant region of the interior cooling passage; and forming a pin bank in the platform cavity, wherein the pin bank includes a plurality of spaced pins extending radially from the floor to the ceiling of the platform cavity.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
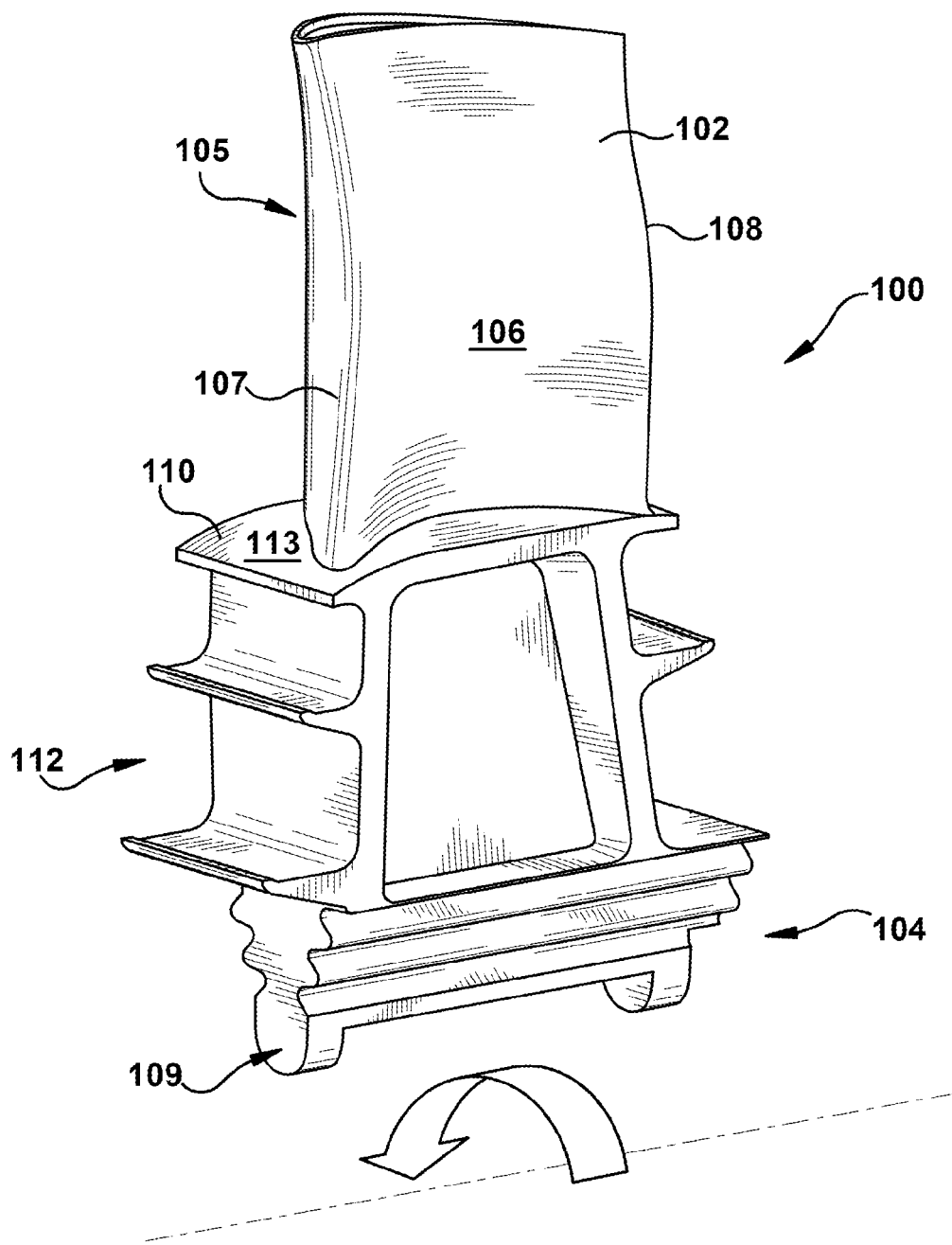
FIG. 1 illustrates a perspective view of an exemplary turbine rotor blade in which embodiments of the present invention may be employed.
Figure 2:
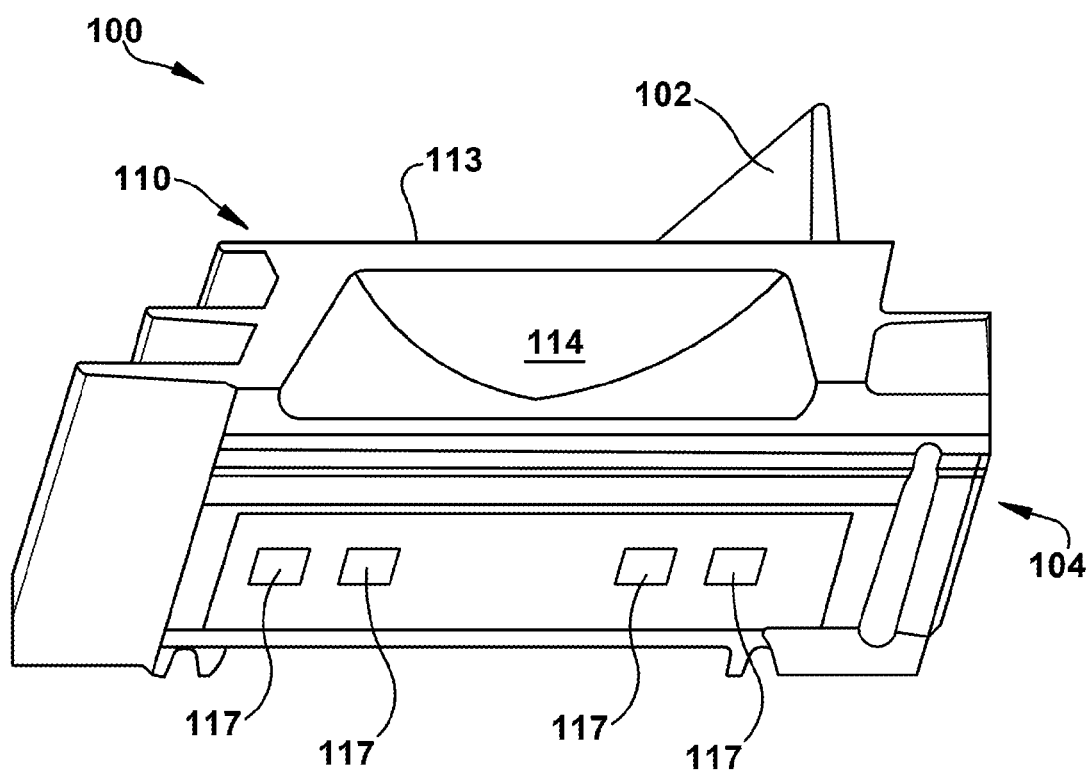
FIG. 2 illustrates an underside view of a turbine rotor blade in which embodiments of the present invention may be used.
Figure 3:
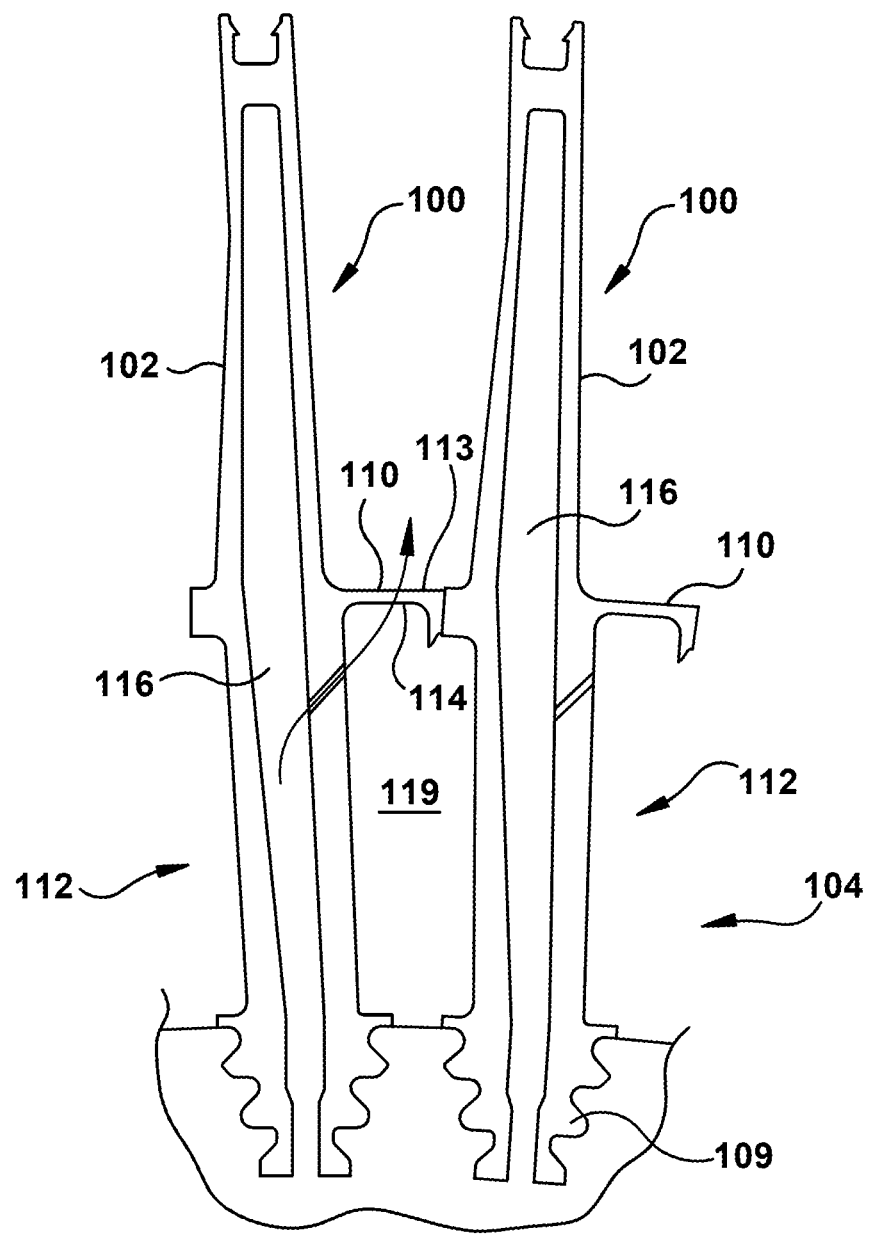
FIG. 3 illustrates a sectional view of neighboring turbine rotor blades having a cooling system according to conventional design.
Figure 4:
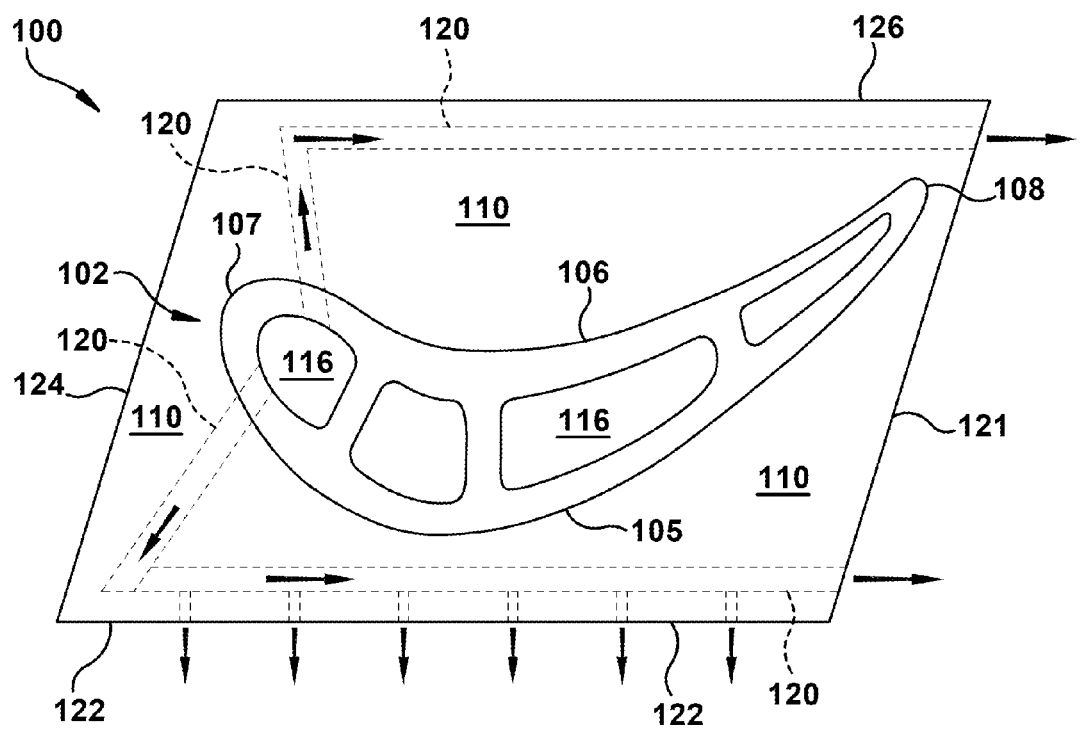
FIG. 4 illustrates a top view of a turbine rotor blade having a platform with interior cooling channels according to conventional design.
Figure 5:
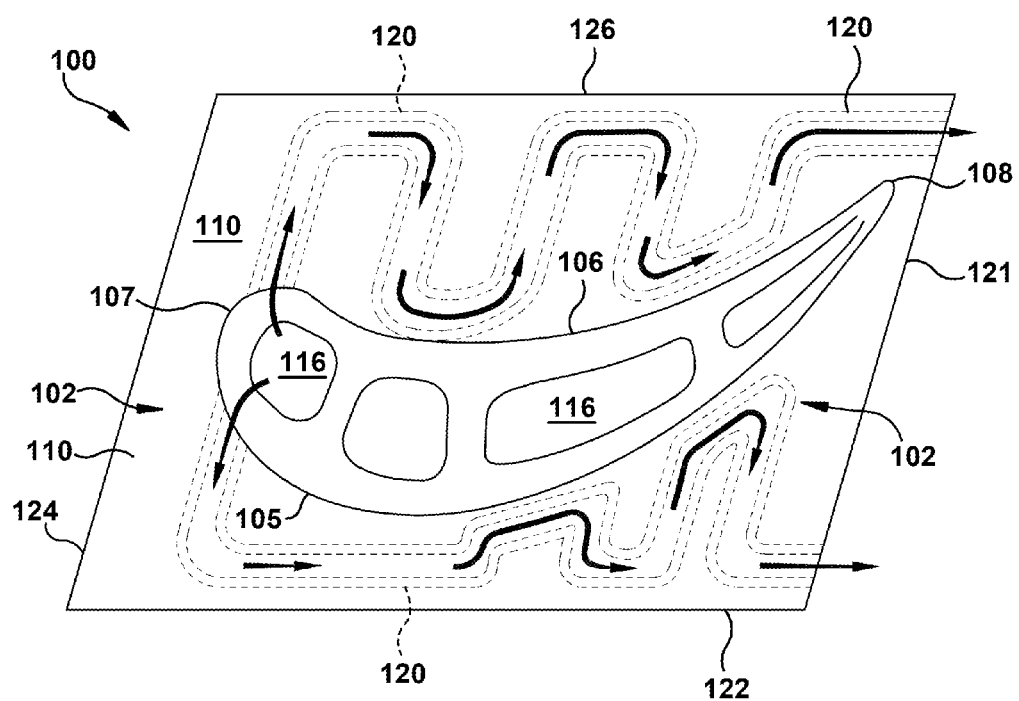
FIG. 5 illustrates a top view of a turbine rotor blade having a platform with interior cooling channels according to an alternative conventional design.
Figure 6:
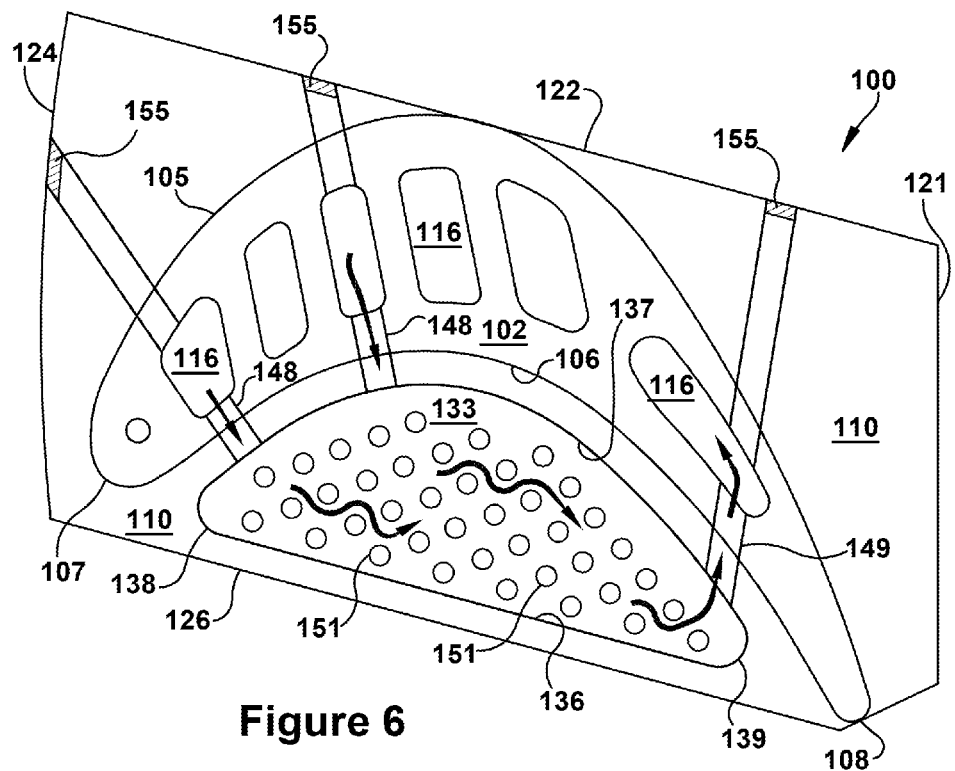
FIG. 6 illustrates a top with partial cross-sectional view of a platform cooling configuration according to an exemplary embodiment of the present invention.
Figure 8:
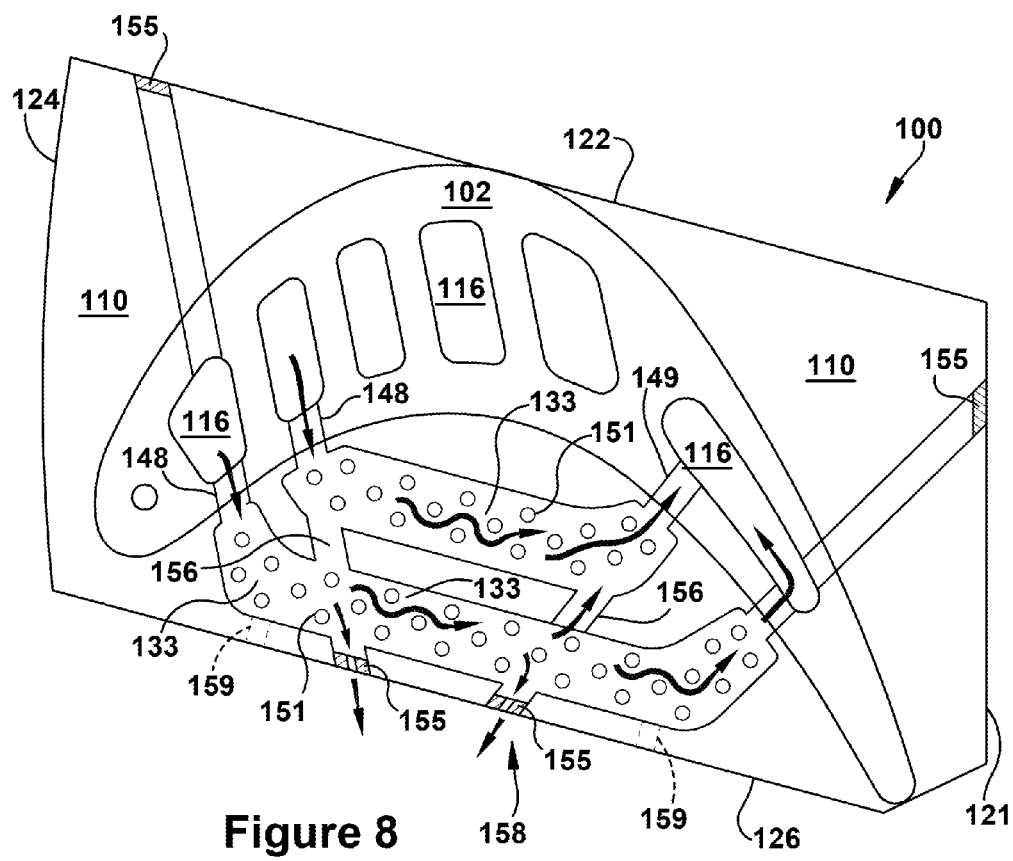
FIG. 8 illustrates a top with partial cross-sectional view of a platform cooling configuration according to an alternative embodiment of the present invention.
Figure 9:
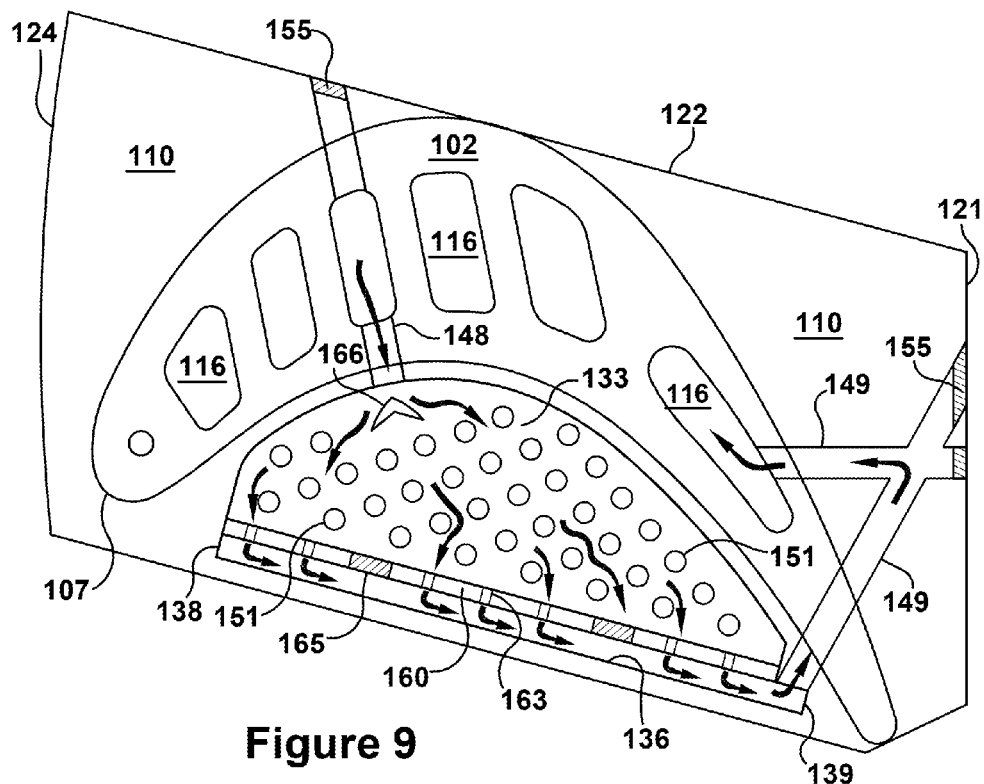
FIG. 9 illustrates a top with partial cross-sectional view of a platform cooling configuration according to an alternative embodiment of the present invention.

It will be appreciated that turbine blades that are cooled via the internal circulation of a coolant typically include an interior cooling passage 116 that extends radially outward from the root, through the platform region, and into the airfoil, as described above in relation to several conventional cooling designs. It will be appreciated that certain embodiments of the present invention may be used in conjunction with conventional coolant passages to enhance or enable efficient active platform cooling, and the present invention is discussed in connection with a common design: an interior cooling passage 116 having a winding or serpentine configuration. As depicted in FIGS. 6, 8, and 9, the serpentine path is typically configured to allow a one-way flow of coolant and includes features that promote the exchange of heat between the coolant and the surrounding rotor blade 100. In operation, a pressurized coolant, which typically is compressed air bled from the compressor (though other types of coolant, such as steam, also may be used with embodiments of the present invention), is supplied to the interior cooling passage 116 through a connection formed through the root 104. The pressure drives the coolant through the interior cooling passage 116, and the coolant convects heat from the surrounding walls.

As the coolant moves through the cooling passage 116, it will be appreciated that it loses pressure, with the coolant in the upstream portions of the interior cooling passage 116 having a higher pressure than coolant in downstream portions. As discussed in more detail below, this pressure differential may be used to drive coolant across or through cooling passages formed in the platform. It will be appreciated that the present invention may be used in rotor blades 100 having internal cooling passages of different configurations and is not limited to interior cooling passages having a serpentine form. Accordingly, as used herein, the term "interior cooling passage" or "cooling passage" is meant to include any passage or hollow channel through which coolant may be circulated in the rotor blade. As provided herein, the interior cooling passage 116 of the present invention extends to at least to the approximate radial height of the platform 116, and may include at least one region of relatively higher coolant pressure (which, hereinafter, is referred to as a "region of high pressure" and, in some cases, may be an upstream section within a serpentine passage) and at least one region of relatively lower coolant pressure (which, hereinafter, is referred to as a "region of low pressure" and, relative to the region of high pressure, may be a downstream section within a serpentine passage).

In general, the various conventional designs of internal cooling passages 116 are effective at providing active cooling to certain regions within the rotor blade 100. However, as one of ordinary skill in the art will appreciate, the platform region proves more challenging. This, at least in part, is due to the awkward geometry of the platform region—i.e., its narrow radial height and the manner in which it juts away from the core or main body of the rotor blade 100. However, given its exposures to the extreme temperatures of hot gas path and high mechanical loading, the cooling requirements of the platform are considerable. As described above, conventional platform cooling designs are ineffective because they fail to address the particular challenges of the region, are inefficient with their usage of coolant, and/or are costly to fabricate.

Referring again to the figures, FIGS. 6 through 11 provide exemplary embodiments of the present invention. More particularly, FIG. 6 illustrates a top view of an exemplary platform cooling arrangement. As shown, the present invention may include a platform cavity 133 formed through the interior of the platform 110 through which coolant from the interior cooling passage 116 is channeled. As described below, the platform cavity 133 may include one or more heat exchanging features, such as pins 151 formed within the platform cavity 133 that approximately align in the radial direction. In addition, the present invention allows for the reuse of the coolant after it flows through the platform cavity 133. As one of ordinary skill in the art will appreciate, this efficient use of coolant generally enhances performance and improves the efficiency of a combustion turbine engine.

In the preferred embodiment of FIG. 6, the platform cavity 133 is positioned within the pressure side of the platform 110. It will be appreciated that other locations, such as within the suction side of the platform 110, are also possible. As illustrated, the rotor blade 100 may have a platform 110 at an interface between the airfoil 102 and the root 104, and the rotor blade 100 may include an interior cooling passage 116 formed therein that extends from a connection with a coolant source at the root 104 to at least the approximate radial height of the platform 110. The interior cooling passage 116 may be configured such that, in operation, it includes a high-pressure coolant region and a low-pressure coolant region. In some cases, the interior cooling passage 116 may have a serpentine configuration, in which case, the high-pressure coolant region of the interior cooling passage 116 may include an upstream region of the serpentine path and the low-pressure coolant region may include a downstream region of the serpentine path. The platform 110 may include a planar topside 113 that is approximately parallel to a planar underside 114. (Note that "planar," as used herein, means approximately or substantially in the shape of a plane. For example, one of ordinary skill in the art will appreciate that platforms may be configured to have an outboard surface that is slight curved and convex, with the curvature corresponding to the circumference of the turbine at the radial location of the rotor blades. As used herein, this type of platform shape is deemed planar, as the radius of curvature is sufficiently great to give the platform a flat appearance.) In addition, along the side of the platform that coincides with the pressure side 106 of the airfoil 102, a pressure side of the platform 110 may include a topside 113 that extends from the airfoil 102 to the pressure side slashface 126. Along a side that coincides with a suction side 105 of the airfoil 102, a suction side of the platform 110 may include a topside 113 that extends circumferentially from the airfoil 102 to a suction side slashface 122. Along a side that coincides with a leading edge 107 of the airfoil 102, the platform 110 may include a topside 113 that extends from the airfoil 102 to a forward edge 124. And, along a side that coincides with a trailing edge 108 of the airfoil 102, the platform 110 may include a topside 113 that extends from the airfoil 102 to an aft edge 121.

The shape of the platform cavity 133 formed within the platform 110 may vary. In one preferred embodiment, as shown in FIG. 6, the platform cavity 133 may be formed with a periphery or outer wall 136 that may be approximately linear and reside in spaced relation and parallel to the pressure side slashface 126. From the outer wall 136, the axial length of the platform cavity 133 may narrow as the cavity 133 extends into the interior regions of the platform 110, as shown. In some embodiments, the narrowing may generally correspond to the curved profile that is formed at the junction of the pressure face 106 of the airfoil 102 and the platform 110 (note: "profile" refers to the perspective of FIGS. 6, 8 and 9). As such, the platform cavity 133 may have a curved inner wall 137 that relates closely in shape and position to the contour profile of the pressure face 106 of the airfoil 102. Accordingly, the inner wall 137 may arc from a forward end 138 of the outer wall 136 to an aft end 139, both of which may be positioned near the pressure side slashface 126 of the platform 110. The platform cavity 133 may include a planar configuration that has an approximate consistent clearance between a planar ceiling 134 (which is an outboard surface) and a planar floor 135 (which is an inboard surface). The ceiling 134 of the platform cavity 133 may reside in proximity to and be approximately parallel with the topside 113 of the platform 110. The floor 135 of the platform cavity 133 may reside in proximity to and be approximately parallel with the underside 114 of the platform 110. It should be apparent to those skilled in the art that other configurations of the platform cavity 133 also may be successfully employed. However, it will be appreciated that the platform cavity 133 of the preferred embodiment of FIG. 6 may be used to efficiently provide cooling coverage to substantial portions or all areas of the pressure side of the platform 110. Those of ordinary skill in the art will appreciate that other performance advantages are also possible.

As depicted in FIGS. 6, 8, and 9, a high-pressure connector 148 may be formed to connect the platform cavity 133 to a high-pressure coolant region of the interior cooling passage 116, and a low-pressure connector 149 may be formed to connect the platform cavity 133 to a low-pressure coolant region of the interior cooling passage 116. (While not specifically indicated in the figures, it will be appreciated that these exemplary embodiment assumes the interior cooling passage 116 is a serpentine one, and that the upstream portions of it reside toward the leading edge 107 and that the downstream portions reside toward the trailing edge 108 of the blade 100. This configuration, however, is not necessary for the practice of the current invention and is exemplary only, as the high-pressure connector 148 and the low-pressure connector 149 may be reconfigured to address other designs.) Accordingly, in operation, a coolant may enter the interior cooling passage 116 at a position near the leading edge 107 of the airfoil 102 and alternately flow radially outward/inward through the interior cooling passage 116 as the coolant winds in an aftwise direction. As shown, the high-pressure connector 148 may be configured such that an upstream (and higher pressure) portion of the interior cooling passage 116 fluidly communicates with a predetermined area of the platform cavity 133. The low-pressure connector 148 may be configured such that a downstream portion of the interior cooling passage fluidly communicates with a predetermined area portion of the platform cavity 133.

As stated, the pressure differential during operation may drive coolant from the high-pressure connector 148 to the low-pressure connector 149 and across the platform cavity 133 and the heat exchanging features contained therein. It will be appreciated that the high-pressure connector 148 and/or the low pressure connector 149 may be efficiently formed via a line-of-sight machining or drilling process, with starting locations being located on any of the edges of the platform 110 (the specific location of which may be dictated by the position of the platform cavity 133 within the platform 110 as well as the configuration of the internal cooling passage 116). In some preferred embodiments, as shown in FIG. 6, the high-pressure connector 148 may be formed such that it extends along a linear path through the platform 110 from a position on the suction side slashface 122 to a junction with the platform cavity 133 and, therebetween, the high-pressure connector 148 may bisect the high-pressure coolant region of the interior cooling channel 116. As also shown in FIG. 6, the present invention may include more than one high-pressure connector 148, though this is not necessary for practice of the current invention and depends upon the particular application. The second high-pressure connector 148 may extend along a linear path through the platform 110 from a position on the forward edge 124 to a junction with the platform cavity 133 and, therebetween, the second high-pressure connector 148 may bisect the high-pressure coolant region of the interior cooling channel 116. The low-pressure connector 149 of FIG. 6 may be formed such that it extends along a linear path from a position on the suction side slashface 122 to a junction with the platform cavity 133 and, therebetween, the low-pressure connector 149 may bisect the low-pressure coolant region of the interior cooling channel 116. In other embodiments, a second low-pressure connector 149 may be formed also. It will be appreciated that, depending on the position of the platform cavity 133, forming the high-pressure and low-pressure connectors 148, 149 from the suction side slashface 122, the forward edge 124, or the aft edge 121 may remove the need of traversing the platform cavity 133 with the machining tool, which could be detrimental to a bank of pins 151 that is already formed in the platform cavity 133. In alternative embodiments, the connectors 148, 149 may be formed during the casting process.

In an alternative embodiment, as shown in FIG. 8, the high-pressure and low-pressure connectors 148, 149 may have a starting location on the pressure side slashface 126. In this case, the high-pressure connector 148 may extend along a linear path through the platform 110 from the pressure side slashface 126 to a junction with the high-pressure coolant region of the interior cooling channel 116 and, therebetween, the high-pressure connector 148 may bisect the platform cavity 133. The low-pressure connector 149 may extend along a linear path through the platform 110 from the pressure side slashface 126 to a junction with the low-pressure coolant region of the interior cooling channel 116 and, therebetween, the low-pressure connector 149 may bisect the platform cavity 133.

In preferred embodiments, as depicted in FIGS. 6, 8, and 9, the location at which the high-pressure connector 148 connects to the platform cavity 133 may be on the opposite end of the platform cavity 133 as the location at which the low-pressure connector 149 connects to the platform cavity 133. In some embodiments, the location at which the high-pressure connector 148 connects to the platform cavity 133 opposes the location at which the low-pressure connector 149 connects to the platform cavity 133 across at least a significant portion of the platform cavity 133. It will be appreciated that this configuration forces the coolant to traverse substantially all of the platform cavity 133 before exiting, which enhances its ability to draw heat from this region of the platform 110.

As shown in the FIGS. 6, 8 and 9, embodiments of the present invention may include more than one high-pressure connector 148 and more than one low-pressure connector 149. Given the manner in which they are formed, the high-pressure and low-pressure connector 148, 149 may include a connector outlet 158 positioned along any of the platform edges (i.e., the aft edge 121, the suction side slashface 122, the forward edge 124, and the pressure side slashface 126). In preferred embodiments, each of the connector outlets 158 may include a plug 155. The plug 155 may be a non-integral component that is installed after the machining of the connectors 148, 149. The plugs 155 may be configured to restrict, limit or altogether prevent coolant from exiting the turbine blade through the connector outlet 158, which may be done for at least a couple of reasons. First, the cross-sectional flow area through the connector outlet may be reduced to impinge the coolant exiting through these outlet locations. This, as one of ordinary skill in the art will appreciate, may result in the exiting coolant having a desired coolant impingement characteristic, such as a high coolant exit velocity, which would improve its cooling effect on a target surface. As such, if positioned on the slashface 122, 126, it will be appreciated that the connector outlet 158 may exhaust an impinged flow of coolant into the slashface cavity that is formed between adjacently installed rotor blades 100. That is, connector outlets 158 may direct impinged coolant having a relatively high velocity against the slashface of the neighboring turbine blade 100. It will be appreciated that the slashface cavity and the slashfaces that define them typically are difficult regions of the platform 110 to cool, and that connector outlets 158 configured in the manner may provide effective cooling to this area.

Second, the cross-sectional flow area of the connector outlets 158 may be reduced because for metering reasons, i.e., the need to evenly distribute or distribute in a desired manner coolant throughout the interior of the platform 110. It will be appreciated that if the connector outlets 158 were not reduced in size compared to the size of the connectors 148, 149, an inordinate portion of coolant likely would exit the platform 110 through the connector outlets 158, leaving an insufficient supply of coolant flowing through the platform cavity 133. The connector outlets 158, thus, may be sized via a preconfigured plug to have a cross-sectional flow area that corresponds to a desired metering characteristic. A "desired metering characteristic," as used herein, refers to a flow area through the coolant passageway or outlet that corresponds or results in a desired distribution of coolant or expected distribution of coolant through the several coolant passageways and/or the outlets that are formed within the platform 110. As shown in FIG. 8, slashface outlets 159 may be included that do not relate to a formed connector 158, 159. These slashface outlets 159 may provide further impingement cooling to the slashface cavity.

Figure 7:
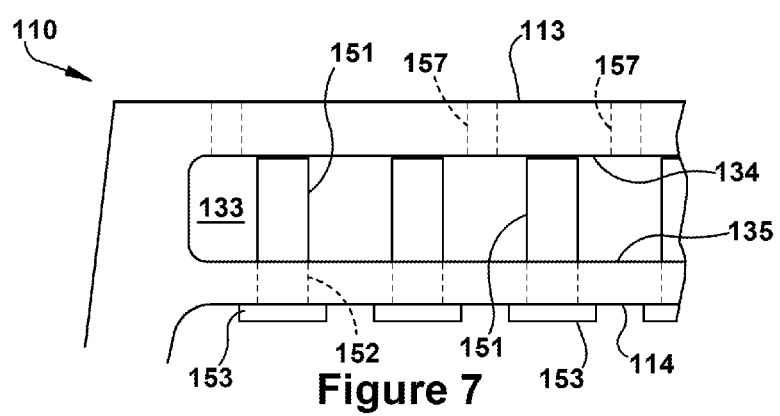
FIG. 7 illustrates a side view of the pin configuration according to an embodiment of the present invention.

In one preferred embodiment, as shown in FIG. 7, one or more topside outlets 157 may be formed that extend from the platform cavity 133 to the platform topside 113. It will be appreciated that the topside outlets 157 may be positioned to draw additional flow of coolant through areas within the platform cavity 133 that require it. In addition, the topside outlets 157 may provide cooling to the areas of the platform 110 through which they extend as well as providing film of cooling to the topside 113 of the platform 110. The topside outlets 157 may be configured to have a predetermined cross-sectional flow area. The predetermined flow area may correspond to at least one of a desired coolant metering characteristic.

In some preferred embodiments, as shown in FIG. 6, the cooling configuration may be configured such that substantially all of the coolant flowing through the platform cavity 133 is returned to the interior cooling passage 116. In such an embodiment, the connector outlets 158 may be plugged with plugs 155 that block the entire cross-sectional flow area through the outlet 158. In addition, the cooling configuration may be formed such that topside outlets 157 or slashface outlets 159 are not included. This type of configuration may be advantageous in certain applications in that substantially all of the coolant bled from the interior cooling passage 116 is made available for further usage through other areas of the rotor blade 100 and/or other downstream applications.

In one preferred embodiment, as illustrated in FIG. 8, the pressure side of the platform 110 may include two platform cavities 133, each having a separate high-pressure connector 148 and a separate low-pressure connector 149, and each having a pin bank that includes a plurality of pins 151 extending from the floor 135 to the ceiling 134 of the platform cavity 133. In this case, the platform cavities 133 may include at least one connector 156 that forms a narrow internal channel between the two cavities 133.

In preferred embodiments of the present invention, the pin bank may include a plurality or a multitude of pins 151. The pins 151 may be cylindrical in shape, though other configurations are possible. The pins 151 may be configured such that the exchange of heat between coolant flowing through the platform cavity 131 and the platform region of the turbine blade is enhanced. The pins 151 may be aligned approximately in the radial direction and, depending on the configuration of the platform cavity 133, may extend between the ceiling 134 and the floor 135 of the platform cavity 133.

In some preferred embodiments, as illustrated in FIG. 7, the pins 151 may be non-integral to the platform 110 of the blade 100. The non-integral pins 151 may be configured to insert through a pin aperture 152 that is formed through the underside 114 of the platform 110. In this case, the non-integral pin 151 may include pin structure having a predetermined length and a pin base 153 having a predetermined width. The predetermined width of the pin base 153 may be wider than the pin aperture 152 such that the pin base 153 forms a stop (i.e., once the pin structure has been inserted a predetermined distance within the pin aperture 152, the pin base 153 stops the pin 151). The predetermined length of the pin 151 may comprise a length at which a tip of the pin 151 resides in close proximity to or makes contact with the ceiling 134 of the platform cavity 133 once the pin base 153 arrests insertion. It will be appreciated that this method allows for the post-cast construction of the pins 151, which may allow more costly/complex casting methods to be avoided.

Figure 10:
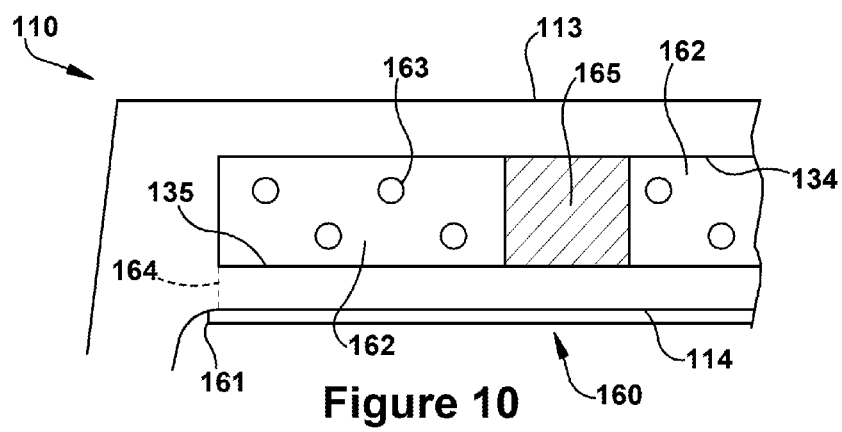
FIG. 10 illustrates a side view of a impingement insert according to an embodiment of the present invention.
Figure 11:
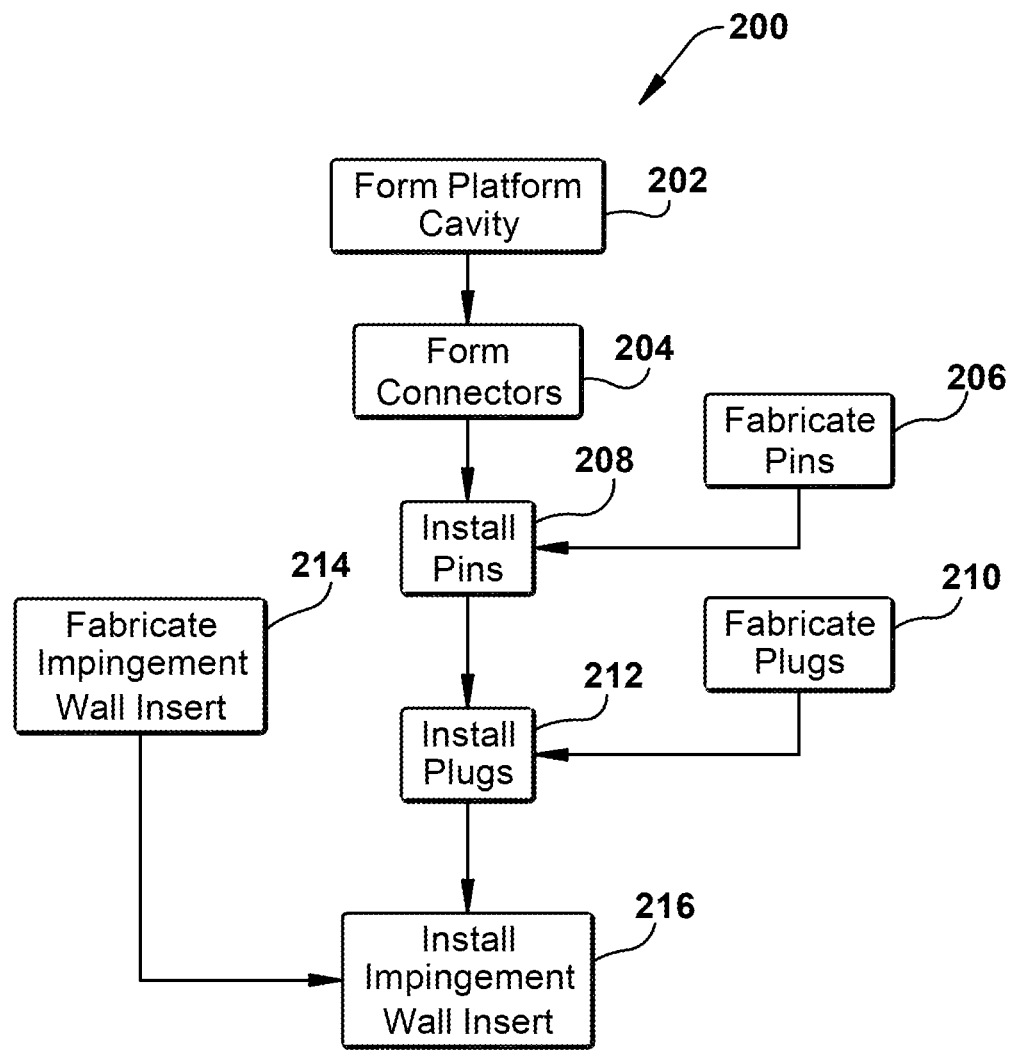
FIG. 11 illustrates a method of manufacture a platform cooling arrangement according to an exemplary embodiment of the present invention.

As shown in FIGS. 9 and 10, one preferred embodiment of the present invention includes an impingement wall 160. The impingement wall 160 may be located and configured to provide impingement cooling to an interior wall of the platform cavity 133. In one preferred embodiment, the impingement wall 160 is configured to provide impingement cooling against the outer wall 136 of the platform cavity 133. Accordingly, as shown in the preferred embodiment of FIG. 9, the impingement wall 160 may be located such that it is approximately parallel to and offset from the outer wall 136. It will be appreciated that this configuration may be used to address the typical difficulties associated with cooling the slashface regions of turbine rotor blades. The impingement wall 160 may be approximately radially oriented, extending from the floor 135 to the ceiling 134 of the platform cavity 133 and stretching across the platform cavity 133 such that it substantially divides the platform cavity 133 into an upstream cavity, into which the high-pressure connector 148 flows, and a downstream cavity, from which the low-pressure connector 149 provides an outlet, as illustrated. In operation, the resulting pressure differential between the upstream cavity and the downstream cavity then may drive coolant through a number of impingement apertures 163 formed through the impingement wall 160. The impingement apertures 163 may be configured such that each has a predetermined cross-sectional flow area that corresponds to a desired impingement cooling characteristic.

In some embodiments, as shown in FIG. 10, the impingement wall 160 may be constructed using a non-integral impingement wall insert 160. The non-integral impingement wall insert 160 may insert into the platform cavity 133 through a slot or insert slot 164 formed through the underside 114 of the platform 110. In this case, the non-integral impingement wall insert 160 may include a base 161 having a predetermined width and a wall structure 162 having a predetermined length. The predetermined width of the base 161 may be wider than the insert slot 164 such that the insert slot 164 forms a stop (i.e., the wall base 161 stops the impingement wall 160 once it has been inserted a predetermined distance within the insert slot 164). The predetermined length of the wall structure 162 may comprise a length at which an outer edge of the wall structure 162 resides in close proximity to or makes contact with the ceiling 134 of the platform cavity 133 once the base 161 contacts the underside 114 of the platform 110 and, thereby, arrests further insertion. It will be appreciated that this method allows for the post-cast construction of an impingement wall 160, which, when compared to the costs of forming the same cooling arrangement using conventional casting methods, provides substantial cost savings. For structural reasons, in some embodiments, a preexisting integral wall 165 may be configured to connect sections of the non-integral impingement wall 160, as illustrated.

As also shown in FIG. 9, a flow divider 166 may be included within the platform cavity 133. The flow divider 166 may be positioned in front of a high-pressure connector 148 such that coolant entering the platform cavity 133 is more evenly dispersed across the platform cavity 133. It will be appreciated that the flow divider 166 may take many configurations. In one preferred embodiment the flow divider 166 has chevron shape.

The present invention further includes a novel method of efficiently forming effective interior cooling channels within the platform region of turbine rotor blades in a cost-effective manner. Referring to flow diagram 200 of FIG. 11, as an initial step 202, the platform cavity 133 may be formed. The platform cavity 133 may include any of the configurations described above. Because of the relatively uncomplicated shape of the platform cavity 133, it may be cost-effectively formed using conventional machining or simplified casting processes. Thus, while the present invention may be used to form an array of complex cooling channels that provide wide coverage to the platform region, expensive casting processes that are typically used for such designs are avoided. Once the platform cavity 133 is formed, at a step 204, the high-pressure connector 148 and the low-pressure connector 149 may be created. As stated, these may be formed using a conventional, relatively uncomplicated machining process (i.e., a conventional line-of-sight machining or drilling process).

As discussed above, in some embodiments, the pins 151 may be non-integral to the rotor blade 100. As such, at a step 206, the pins 151 may be fabricated and the pin apertures 152 machined into the platform underside 114. At a step 208, the pins 151 may be installed in the pin apertures 152. This may be done using conventional methods, such as welding, brazing, or mechanical attachment.

Separately, at a step 210, plugs 155 may be fabricated. As discussed above, the plugs 155 may have several different configurations and function to reduce or stop altogether the coolant flowing through an outlet. The plugs 155 may be fabricated from conventional materials. At a step 212, the plugs 155 may be installed in predetermined locations. This may be done using conventional methods, such as welding, brazing, or mechanical attachment.

As discussed above, in some embodiments, an impingement wall 160 may be included within the platform cavity 133. At a step 214, the non-integral impingement wall insert 160 may be fabricated and the insert slot 164 machined through the underside 113 of the platform 110. Finally, at a step 216, the impingement wall insert 160 may be installed in the insert slot 164. This may be done using conventional methods, such as welding, brazing, or mechanical attachment In operation, according to one exemplary embodiment, the cooling apparatus of the present invention may function as follows. A portion of the coolant supply flowing through the interior cooling passage 116 enters the platform cavity 133 via the high-pressure connector 148. As the coolant passes through the pin bank, the coolant may convect heat from the platform 110. The coolant then may exit the platform cavity 133 through the low-pressure connector 149 and, thereby, rejoin the coolant flowing through the platform cooling passage 116. In this manner, the platform cooling arrangement of the present invention extracts a portion of the coolant from the interior cooling passage 116, uses the coolant to remove heat from the platform 110, and then returns the coolant to the interior cooling passage 116, where the coolant may be used further. Accordingly, it will be appreciated that the present invention provides a mechanism by which the platform region of a combustion turbine rotor blade may be effectively and efficiently cooled.

Further, it will be appreciated that the platform cooling configuration of the present application provides greater flexibility in designing, redesigning, reconfiguring, and/or retrofitting platform cooling arrangements in existing or new rotor blades. Before, complex platform cooling geometries necessarily meant a costly casting process. The present application teaches methods by which cooling channels of complex design may be formed through a combination of simplified machining and/or casting processes. Finally, in some embodiments, the present application teaches a method by which the platform 110 may be cooled using interior channels that do not vent directly into the hot gas-path from the platform 110 itself. As stated, this "recycling" of coolant generally increases the efficiency of its usage, which increases the efficiency of the engine.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A platform cooling arrangement in a turbine rotor blade having a platform at an interface between an airfoil and a root, wherein the rotor blade includes an interior cooling passage formed therein that extends from a connection with a coolant source at the root to at least the approximate radial height of the platform, wherein, in operation, the interior cooling passage comprises a high-pressure coolant region and a low-pressure coolant region, and wherein, along a side that coincides with a pressure side of the airfoil, a pressure side of the platform comprises a topside extending circumferentially from the airfoil to a pressure side slashface, and along a side that coincides with a suction side of the airfoil, a suction side of the platform comprises a topside extending circumferentially from the airfoil to a suction side slashface; the platform cooling arrangement comprising:

a platform cavity formed within at least one of the pressure side and the suction side of the platform, the platform cavity including an inboard floor and an outboard ceiling;

a high-pressure connector that connects the platform cavity to the high-pressure coolant region of the interior cooling passage;

a low-pressure connector that connects the platform cavity to the low-pressure coolant region of the interior cooling passage; and a pin bank formed within the platform cavity, wherein the pin bank includes a plurality of pins that extend in an approximate radial direction between the floor and the ceiling of the platform cavity;

wherein the pins comprise non-integral pins, each of which inserts through a pin aperture formed through the underside of the platform.

2. The platform cooling arrangement according to claim 1, wherein:

the platform cavity resides in the pressure side of the platform;

the platform cavity comprises a planar configuration having an approximate consistent radial clearance between the floor and the ceiling;

the platform topside is planar; and the ceiling of the platform cavity resides in proximity to and is approximately parallel with the topside of the platform.

3. The platform cooling arrangement according to claim 2, wherein:

the high-pressure connector extends along a linear path through the platform from a position on the suction side slashface to a junction with the platform cavity and, therebetween, bisects the high-pressure coolant region of the interior cooling passage; and the low-pressure connector extends along a linear path from a position on the suction side slashface to a junction with the platform cavity and, therebetween, bisects the low-pressure coolant region of the interior cooling passage.

4. The platform cooling arrangement according to claim 3, wherein the high-pressure connector comprises a non-integral plug positioned at the suction side slashface and the low-pressure connector comprises a non-integral plug positioned at the suction side slashface;

wherein the non-integral plugs for the high-pressure connector and low-pressure connector are configured such that each restricts coolant from exiting the turbine blade through the suction side slashface in a desired manner.

5. The platform cooling arrangement according to claim 2, wherein:

the platform comprises a planar underside that is approximately parallel to the planar topside; and the interior cooling passage comprises a serpentine path, the high-pressure coolant region of the interior cooling passage comprising an upstream region of the serpentine path and the low-pressure coolant region comprising a downstream region of the serpentine path.

6. The platform cooling arrangement according to claim 2, wherein the location at which the high-pressure connector connects to the platform cavity opposes the location at which the low-pressure connector connects to the platform cavity across at least a significant portion of the platform cavity.

7. The platform cooling arrangement according to claim 2, wherein the platform cavity comprises an outer wall and an inner wall, the outer wall comprising a linear shape and residing approximately parallel and in spaced relation to the pressure side slashface, and the inner wall comprising a curved shape, forming an arc that stretches from a forward end of the outer wall to an aft end of the outer wall.

8. The platform cooling arrangement according to claim 7, wherein:

the profile of the arc of the inner wall corresponds in shape and approximate position to the profile of the pressure side of the airfoil where the pressure side of the airfoil intersects the platform; and the forward end of the outer wall comprises an axial position near the leading edge of the airfoil and the aft end of the outer wall comprises an axial position near the trailing edge of the airfoil.

9. The platform cooling arrangement according to claim 7, wherein:

a plurality of slashface outlets form outlets from the platform cavity through at least one of the pressure side slashface and the suction side slashface;

a plurality of topside outlets form outlets from the platform cavity through the topside of the platform;

the slashface outlets are configured to have a predetermined cross-sectional flow area, the predetermined flow area corresponding to at least one of a desired coolant impingement characteristic and a desired coolant metering characteristic; and the topside outlets are configured to have a predetermined cross-sectional flow area, the predetermined flow area corresponding to a desired coolant metering characteristic.

10. The platform cooling arrangement according to claim 2, wherein;

the high-pressure connector extends along a linear path through the platform from a position on the pressure side slashface to a junction with the high-pressure coolant region of the interior cooling passage and, therebetween, bisects the platform cavity; and the low-pressure connector extends along a linear path from a position on the pressure side slashface to a junction with the low-pressure coolant region of the interior cooling passage and, therebetween, bisects the platform cavity.

11. The platform cooling arrangement according to claim 10, wherein:

the high-pressure connector comprises a connector outlet on the pressure side slashface, the connector outlet comprising a reduced cross-sectional flow area;

the low-pressure connector comprises a connector outlet on the pressure side slashface, the connector outlets comprising a reduced cross-sectional flow area;

the reduced cross-sectional flow area comprises a cross-sectional flow area that is less than the cross-sectional flow area through the high-pressure connector or the low-pressure connector that the connector outlet serves; and each of the connector outlets of reduced cross-sectional flow area comprises a predetermined cross-sectional flow area, the predetermined cross-sectional flow area corresponding to at least one of a desired coolant impingement characteristic and a desired metering characteristic.

12. The platform cooling arrangement according to claim 2, wherein the pressure side of the platform comprises at least two substantially separate platform cavities, each platform cavity having a high-pressure connector and a low-pressure connector, and a pin bank.

13. The platform cooling arrangement according to claim 12, wherein the platform cavities comprise at least one cavity connector that forms a narrow connector between the cavities.

14. The platform cooling arrangement according to claim 2, wherein, offset from and approximately parallel to the outer wall, the platform cavity comprises an impingement wall, the impingement wall comprising a wall that substantially divides the platform cavity into an upstream cavity, which comprises the location at which the high-pressure connector connects to the platform cavity, and a downstream cavity, which comprises the location at which the low-pressure connector connects to the platform cavity; and wherein the impingement wall includes a plurality of impingement apertures that are configured to impinge a flow of coolant traveling from the upstream cavity to the downstream cavity and direct the impinged flow of coolant against the outer wall.

15. The platform cooling arrangement according to claim 14, wherein the impingement wall comprises at least one non-integral impingement wall insert, the non-integral impingement wall insert comprising a wall insert having a plurality of impingement apertures formed therethrough that inserts a predetermined distance through a slot formed through the underside of the platform.

16. The platform cooling arrangement according to claim 15, wherein:

the non-integral impingement wall insert comprises a wall structure having a predetermined length and a wall base having a predetermined width;

the predetermined width being wider than the underside insert slot such that the wall base forms a stop; and the predetermined length comprising a length at which an edge of the wall structure resides in close proximity to the ceiling of the platform cavity once the non-integral impingement wall insert is inserted such that the base stops insertion by contacting the platform underside.

17. The platform cooling arrangement according to claim 2, wherein the platform cavity comprises a flow divider, the flow divider positioned in front of the high-pressure connector and configured to divide the flow of coolant as the coolant enters the platform cavity.

18. The platform cooling arrangement according to claim 1, wherein:

the non-integral pin comprises a pin structure having a predetermined length and a pin base having a predetermined width;

the predetermined width being wider than the pin aperture such that the pin base forms a stop when the non-integral pin inserts into the pin aperture; and the predetermined length comprising a length at which a tip of the pin resides in close proximity to the ceiling of the platform cavity once the pin base contacts the underside of the platform.

19. A method of creating a platform cooling arrangement in a turbine rotor blade having a platform at an interface between an airfoil and a root, wherein the rotor blade includes an interior cooling passage formed therein that extends from a connection with a coolant source at the root to at least the approximate radial height of the platform, wherein, in operation, the interior cooling passage comprises at least a high-pressure coolant region and a low-pressure coolant region, and wherein, along a side that coincides with a pressure side of the airfoil, a pressure side of the platform comprises a topside extending circumferentially from the airfoil to a pressure side slashface; the method comprising the steps of:

forming a platform cavity within the pressure side of the platform, the platform cavity including an inboard substantially planar floor that opposes an outboard substantially planar ceiling;

from a position on the pressure side slashface or a suction side slashface, machining a high-pressure connector that connects the platform cavity to the high-pressure coolant region of the interior cooling passage;

from a position on the pressure side slashface or the suction side slashface, machining a low-pressure connector that connects the platform cavity to the low-pressure coolant region of the interior cooling passage; and forming a pin bank in the platform cavity, wherein the pin bank includes a plurality of spaced pins extending radially between the floor and the ceiling of the platform cavity, wherein the step of forming a pin bank in the platform cavity comprises the steps of:

machining a plurality of pin apertures at predetermined locations on the underside of the platform;

fabricating a plurality of pins such that the pins insert into the platform cavity through the pin apertures in a desired manner; and fixedly installing the pins within the platform cavity through the pin apertures, the installed pins comprising a predetermined length such that, upon installation, an end of the each pin resides in close proximity to the ceiling of the platform cavity.

20. The method according to claim 19, wherein:

the platform topside and a platform underside are each planar and approximately parallel;

the platform cavity comprises a planar configuration having an approximate constant radial clearance between the floor and ceiling;

the ceiling of the cavity resides in proximity to and is approximately parallel with the topside of the platform;

the location at which the high-pressure connector connects to the platform cavity opposes the location at which the low-pressure connector connects to the platform cavity across at least a significant portion of the platform cavity; and the interior cooling passage comprises a serpentine path, the high-pressure coolant region of the interior cooling passage comprising an upstream region of the serpentine path and the low-pressure coolant region comprising a downstream region of the serpentine path.

21. The method according to claim 20, further comprising the steps of:
fabricating plugs of a predetermined configuration; and
with the fabricated plugs, plugging each connector outlets formed from the machining of the low-pressure connector and the high-pressure connector;
wherein the predetermined configuration of the plugs reduces the cross-sectional flow area from each of the connector outlets such that at least one of a desired coolant impingement characteristic and a desired metering characteristic is achieved.

22. The method of claim 21, wherein the platform cavity is formed to include an outer wall and an inner wall, the outer wall residing approximately parallel and in spaced relation to the pressure side slashface and the inner wall forming an arc that stretches from a forward end of the outer wall to an aft end of the outer wall;
wherein the profile of the arc of the inner wall corresponds in shape and approximate position to the profile of the pressure side of the airfoil where the pressure side of the airfoil intersects the platform; and
wherein the forward end of the outer wall comprises an axial position near the leading edge of the airfoil and the aft end of the outer wall comprises an axial position near the trailing edge of the airfoil.

23. The method according to claim 19, wherein:
the high-pressure connector extends along a linear path through the platform from a position on the suction side slashface to a junction with the platform cavity and, therebetween, bisects the high-pressure coolant region of the interior cooling channel; and
the low-pressure connector extends along a linear path from a position on the suction side slashface to a junction with the platform cavity and, therebetween, bisects the low-pressure coolant region of the interior cooling passage.

24. The method of claim 19, further comprising the step of machining a plurality of cooling apertures, each cooling aperture comprising a narrow outlet that extends from the platform cavity to one of the platform topside, the pressure side slashface, and the suction side slashface;
wherein the cooling apertures are configured to have a predetermined cross-sectional flow area, the predetermined flow area corresponding to at least one of a desired coolant impingement characteristic and a desired coolant metering characteristic.

25. A platform cooling arrangement in a turbine rotor blade having a platform at an interface between an airfoil and a root, wherein the rotor blade includes an interior cooling passage formed therein that extends from a connection with a coolant source at the root to at least the approximate radial height of the platform, wherein, in operation, the interior cooling passage comprises a high-pressure coolant region and a low-pressure coolant region, and wherein, along a side that coincides with a pressure side of the airfoil, a pressure side of the platform comprises a topside extending circumferentially from the airfoil to a pressure side slashface, and along a side that coincides with a suction side of the airfoil, a suction side of the platform comprises a topside extending circumferentially from the airfoil to a suction side slashface; the platform cooling arrangement comprising:
a platform cavity formed within at least one of the pressure side and the suction side of the platform, the platform cavity including an inboard floor and an outboard ceiling;
a high-pressure connector that connects the platform cavity to the high-pressure coolant region of the interior cooling passage;
a low-pressure connector that connects the platform cavity to the low-pressure coolant region of the interior cooling passage; and
a pin bank formed within the platform cavity, wherein the pin bank includes a plurality of pins that extend in an approximate radial direction between the floor and the ceiling of the platform cavity;
wherein:
the platform cavity resides in the pressure side of the platform;
the platform cavity comprises a planar configuration having an approximate consistent radial clearance between the floor and the ceiling;
the platform topside is planar;
the ceiling of the platform cavity resides in proximity to and is approximately parallel with the topside of the platform;
offset from and approximately parallel to the outer wall, the platform cavity comprises an impingement wall, the impingement wall comprising a wall that substantially divides the platform cavity into an upstream cavity, which comprises the location at which the high-pressure connector connects to the platform cavity, and a downstream cavity, which comprises the location at which the low-pressure connector connects to the platform cavity; and
the impingement wall includes a plurality of impingement apertures that are configured to impinge a flow of coolant traveling from the upstream cavity to the downstream cavity and direct the impinged flow of coolant against the outer wall.

* * * * *

UNITED STATES PATENT AND TRADEMARK OFFICE
CERTIFICATE OF CORRECTION

PATENT NO. : 8,814,518 B2
APPLICATION NO. : 12/915477
DATED : August 26, 2014
INVENTOR(S) : Harris, Jr. et al.

Page 1 of 1

It is certified that error appears in the above-identified patent and that said Letters Patent is hereby corrected as shown below:

In The Claims

In Column 3, Line 9, delete "blade 110" and insert -- blade 100 --, therefor.

In Column 5, Line 63, delete "platform 116," and insert -- platform 110, --, therefor.

In Column 12, Line 18, delete "underside 113" and insert -- underside 114 --, therefor.

In Column 14, Line 55, in Claim 10, delete "wherein;" and insert -- wherein: --, therefor.

Signed and Sealed this
Fourteenth Day of April, 2015

Michelle K. Lee
*Director of the United States Patent and Trademark Office*